(12) United States Patent
Yoo et al.

(10) Patent No.: US 8,874,132 B2
(45) Date of Patent: Oct. 28, 2014

(54) APPARATUS AND METHOD FOR QUERY PROCESSING OF MOVING OBJECT IN MOBILE COMMUNICATION SYSTEM

(75) Inventors: Seung-Yeol Yoo, Suwon-si (KR); Young-Hee Park, Seoul (KR); Yon-Dohn Chung, Seoul (KR)

(73) Assignees: Samsung Electronics Co., Ltd., Suwon-si (KR); Korea University Research and Business Foundation, Seoul (KR)

(*) Notice: Subject to any disclaimer, the term of this patent is extended or adjusted under 35 U.S.C. 154(b) by 614 days.

(21) Appl. No.: 13/237,712

(22) Filed: Sep. 20, 2011

(65) Prior Publication Data

US 2012/0071171 A1 Mar. 22, 2012

(30) Foreign Application Priority Data

Sep. 20, 2010 (KR) .......... 10-2010-0092405

(51) Int. Cl.
  *H04W 24/00* (2009.01)
  *H04W 4/02* (2009.01)
(52) U.S. Cl.
  CPC .................. *H04W 4/022* (2013.01)
  USPC ................ 455/456.1; 455/453.3; 455/456.5
(58) Field of Classification Search
  USPC ............ 455/403, 404.1, 404.2, 422.1, 432.1, 455/441, 456.1–456.6
  See application file for complete search history.

(56) References Cited

U.S. PATENT DOCUMENTS

| | | | |
|---|---|---|---|
| 7,840,222 B2 | 11/2010 | Hampel et al. | |
| 2007/0270165 A1* | 11/2007 | Poosala ............... | 455/456.3 |
| 2009/0282122 A1* | 11/2009 | Patel et al. .......... | 709/207 |
| 2010/0064373 A1* | 3/2010 | Cai et al. ............ | 726/26 |
| 2011/0263275 A1* | 10/2011 | Kale et al. .......... | 455/456.2 |
| 2013/0324155 A1* | 12/2013 | Islam et al. ......... | 455/456.1 |
| 2014/0016765 A1* | 1/2014 | Gruchala et al. .... | 379/142.06 |

* cited by examiner

*Primary Examiner* — Ajit Patel

(57) ABSTRACT

A mobile communication system process a query of a location-based service. More particularly, an apparatus and a method reduce communication processes for an unnecessary query by expanding a resident domain with a query type. The apparatus includes a server for expanding a resident domain comprising a query to be operated by the moving object when the location-based service is used and the moving object for reducing the number of communications with the server according to the expansion of the resident domain.

20 Claims, 9 Drawing Sheets

APPARATUS AND METHOD FOR QUERY PROCESSING OF MOVING OBJECT IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Sep. 20, 2010, and assigned Serial No. 10-2010-0092405, the entire disclosure of which is hereby incorporated by reference.

TECHNICAL FIELD OF THE INVENTION

The present invention relates generally to a mobile communication system for processing a query of a location-based service. More particularly, the present invention relates to an apparatus and a method for reducing communication process for an unnecessary query by expanding a resident domain with a query type.

BACKGROUND OF THE INVENTION

Recently, as various Location-Based Services (LBSs) and database applications for dealing with moving objects such as mobile communication terminals, Personal Digital Assistants (PDA), notebooks, vehicles, and aircrafts, are introduced, it is necessary to store and manage space (location) information of the moving object and to process various queries of a user demanding information.

The LBS indicates a wireless communication service for locating the moving object and provides necessary information according to the location. Using this service, it is possible to detect access of the moving object which enters a particular area. Such a service can be applied to a security system of a particular restricted area, and a sensor based monitoring system.

However, when movement speed and direction of the moving, object are not predictable, an operation for indexing the moving object is periodically required and the moving object should frequently communicate with a server to process a query.

FIG. 1 depicts a resident domain of the moving object in a general mobile communication system.

Referring to FIG. 1, the resident domain indicates an area including a query to be processed directly by the moving object. It is assumed that the moving object 100 has an operation capability to process two queries at most.

Due to the operation capability of the moving object 100, the resident domain of the moving object 100 can be set to a domain 110 covering two queries Q1 and Q2 and the moving object 100 can process the queries by communicating with servers corresponding to the queries Q1 and Q2.

However, when the moving object 100 has nothing to do with the query Q2 in the resident domain, it is prone to attempt unnecessary communications with the server corresponding to the query Q2. The moving object, which is capable of processing two queries, processes the unnecessary query Q2. In practice, the moving object 100 processes only the query Q1 in the resident domain.

In other words, the resident domain is defined while not obtaining the query involving, the moving object 100. Such a problem can be addressed by defining the resident range to the domain including the query involving the moving object 100.

SUMMARY OF THE INVENTION

To address the above-discussed deficiencies of the prior art, it is an aspect of the present disclosure to provide an apparatus and a method for reducing unnecessary communication between a moving, object and a server when a location-based service is used in a mobile communication system.

Another aspect of the present disclosure is to provide an apparatus and a method for reducing unnecessary communication by expanding, a resident domain of a moving object in a mobile communication system.

Another aspect of the present disclosure is to provide an apparatus and a method for expanding a resident domain of a moving object with a query type in a mobile communication system.

Yet another aspect of the present disclosure is to provide an apparatus and a method for providing an index structure including a moving object, a query relating to the moving object, bit vector information of a domain to which the moving object can move, in a mobile communication system.

In accordance with an aspect of the present disclosure, an apparatus for processing a query of a moving object in a mobile communication system is provided. The apparatus includes a server for expanding a resident domain including a query to be operated by the moving object when a location-based service is used; and the moving object for reducing the number of communications with the server according to the expansion of the resident domain.

In accordance with another aspect of the present disclosure, a method for processing a query of a moving object in a mobile communication system is provided. The method includes expanding a resident domain including a query to be operated by the moving object when a location-based service is used; and reducing the number of communications between the moving object and a server according to the expansion of the resident domain.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure.

The various embodiments of the present disclosure provide an apparatus and a method for reducing unnecessary communication between a moving object and a server by expanding a resident domain of the moving objet according to a query type when a location-based service is used in a mobile communication system.

To reduce the unnecessary communication between the moving object and the server, the present disclosure an index structure including the moving object, a query relating to the moving object, and bit vector information of a domain to which the moving object can move. The moving object is a terminal used to detect movement of a user, and can employ a mobile communication terminal, a Radio Frequency Identification (RFID) tag device, and the like. The resident domain is a domain covering the query to be operated directly by the moving object, and can be determined according to operation capability of the moving object.

Figure 2:
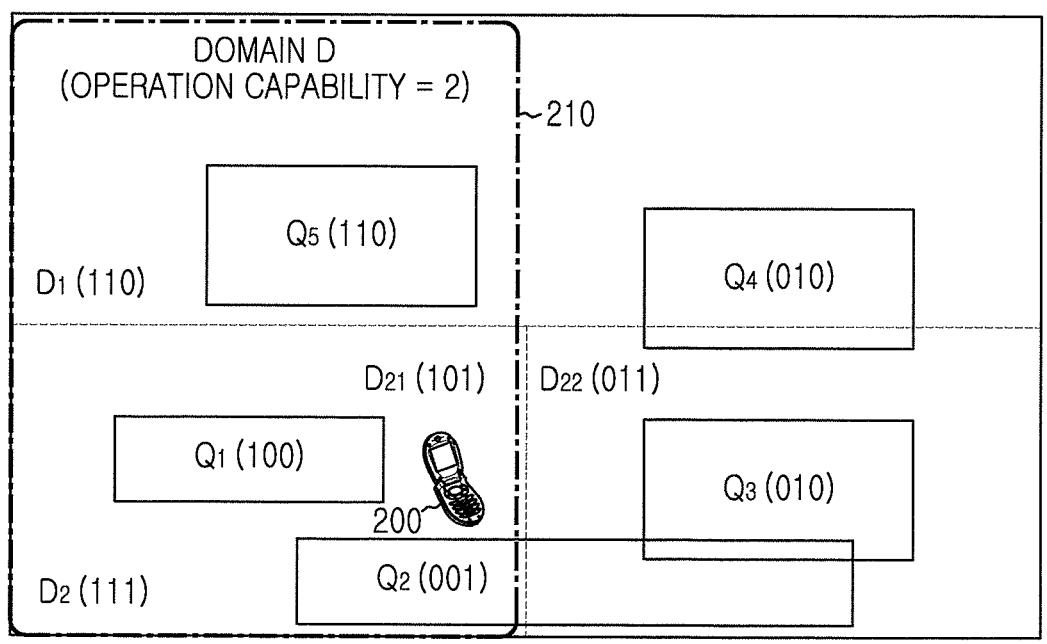
FIG. 2 illustrates a resident domain expansion of a moving object according to the present disclosure.

FIG. 2 illustrates a resident domain expansion of a moving object according to the present disclosure.

Referring to FIG. 2, the moving object, which is a terminal used to detect movement of the user, can employ a mobile communication terminal.

It is assumed that the moving object 200 has an operation capability to process two queries at most, and is unrelated to a query Q2.

Figure 1:
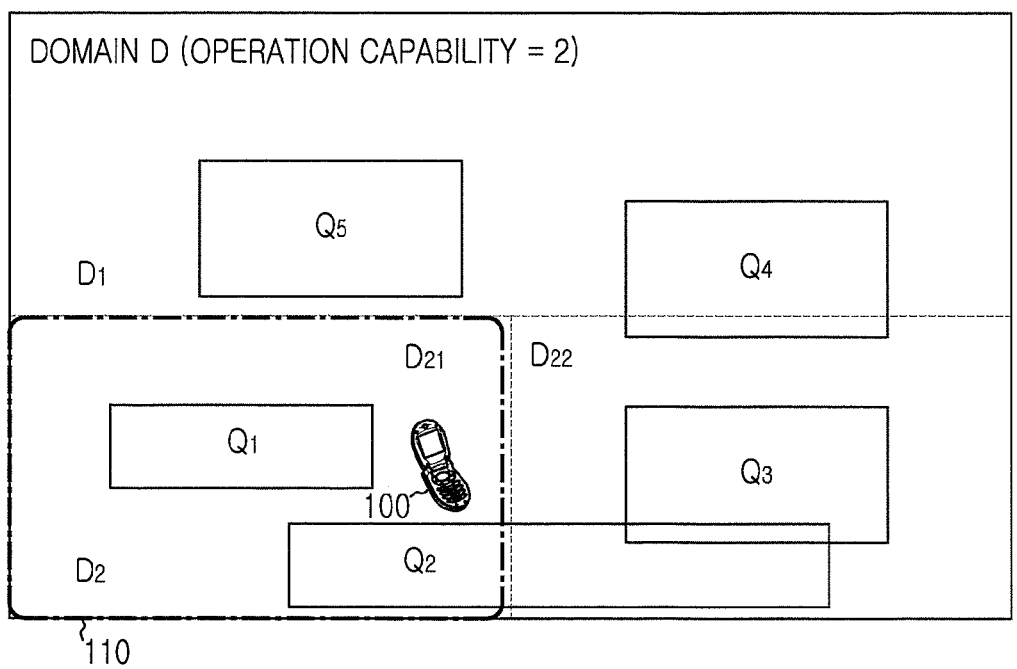
FIG. 1 illustrates a resident domain of a moving object in a general mobile communication system.

As stated earlier, since the conventional moving object 100 of FIG. 1 does not consider the type of the query indicating the relevance, the resident domain corresponding to Q1 and Q2 is allocated. In result, the moving object 100 unnecessarily communicates with the server for the query Q2.

By contrast, since present queries each include a query type (e.g. bit information) indicating the relevance to the moving object 200, it is possible to classify the query relating to the moving object when the resident domain 210 is set. By taking account of the query type, the resident domain 210 is expanded to a resident domain including other related query, instead of the query Q2 unrelated to the moving object 200.

As such, while the expanded resident domain 210 includes the queries Q1, Q2, and Q5, the moving object 200 communicates with servers corresponding to the queries Q1 and Q5 and does not communicate with a server corresponding to the query Q2 because the moving object has no relation with the query Q2. Thus, a cost incurred by the unnecessary communication with the server can be avoided.

Based on the fact that transmission and reception of a message requesting information of the new resident domain are reduced as the resident domain expands, the query type is classified and the resident domain is expanded to the resident domain including only the query relating to the moving object 200.

Figure 3:
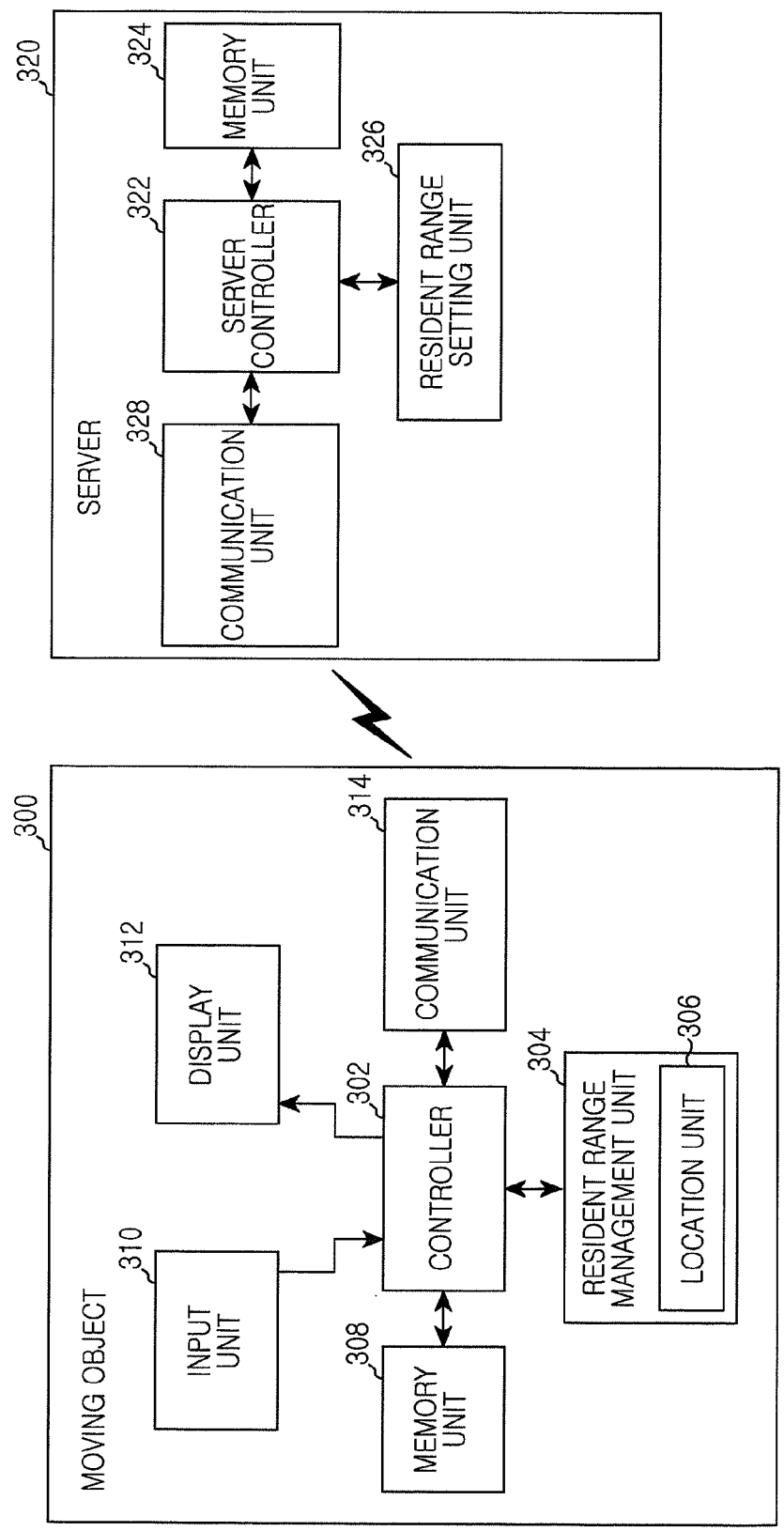
FIG. 3 illustrates a block diagram of a mobile communication system for expanding the resident domain of the moving object according to the present disclosure.

FIG. 3 illustrates a mobile communication system for expanding the resident domain of the moving object according to the present disclosure.

Referring to FIG. 3, the mobile communication system can include a moving object 300 and a server 320 for detecting movement of the moving object 300 and processing the query.

The moving object 300 includes a controller 302, a resident range management unit 304, a memory unit 308, an input unit 310, a display unit 312, and a communication unit 314. The resident range management unit 304 can include a location unit 306.

The controller 302 of the moving object 300 controls operations of the moving object 300. For example, the controller 302 processes and controls to communicate data. In addition to this typical function, the controller 302 is allocated a resident domain including only the query relating to the moving object 300. Next, the controller 302 detects the location of the controller 302 in the resident domain. When entering a query region or leaving the resident domain, the controller 302 communicates with the server 320. Herein, the resident domain expanded, which includes only the query relating to the moving object 300, is wider than the general resident domain of the moving object.

Using the expanded resident domain, the moving object 300 processes to reduce the communications with the server 320.

The resident range management unit 304 obtains necessary information for the resident range allocation under control of the controller 302, and processes to send the information to the server 320.

Herein, the necessary information for the resident range allocation includes an identifier (object ID (Oid)) of the moving object 300, a location (p) of the moving object 300, an object bit vector (O.bv) and information of operation capability (n) for processing the query. The resident range management unit 304 receives the resident range set by the server 320 and a list of queries in the resident range The location unit 306 of the resident range management unit 304 can include a Global Positioning System (GPS) module, and obtains location information according to the movement of the moving object 300.

The memory unit 308 may include, for example, a Read Only Memory (ROM), a Random Access Memory (RAM), a flash ROM, and such. The ROM stores microcodes and reference data of a program for processing and controlling the controller 302 and the resident range management unit 304.

The RAM, which is a working memory of the controller 302, stores temporary data generating in the program execution. The flash ROM includes updatable storage data such as a phonebook, outgoing messages, incoming messages, and such.

The input unit 310 includes a plurality of function keys such as number keys 0~9, a menu key, a cancel key, an OK key, a call key, an end key, an Internet access key, navigation keys (or direction keys), character input keys, and the like. The input unit 310 provides the controller 302 with key input data corresponding to the key pressed by the user.

The display unit 312 displays status information, characters, videos, and still images during the operation of the portable terminal. The display unit 312 can employ a color Liquid Crystal Display (LCD), Active Mode Organic Light Emitting Diode (AMOLED), and such. When the display unit 312 includes a touch input device and is applied to a touch-type portable terminal, the display unit 312 can be used as the input device.

The communication unit 314 processes to transmit and receive radio signals of data input and output via an antenna (not illustrated). For instance, during transmission, the communication unit 314 channel-encodes, spreads, Radio Frequency (RF)-processes, and transmits data. During reception, the communication unit 314 converts the received RF signal into a baseband signal and restores the data by de-spreading and channel-decoding the baseband signal. In various embodiments of the present disclosure, the communication unit 314 transmits information for setting the resident range and a request for the query result, and receives the resident range and the list information of the queries.

The server 320 can include a server controller 322, a resident domain setting unit 326, a memory unit 324, and a communication unit 328. The server 320 can register the query processable by the user.

The server controller 322 controls operations of the server for processing the query. The server controller 322 sets the resident domain of the moving object 300 using the information received from the moving object 300.

The server controller 322 sets the resident domain including only the query relating to the moving object 300 so as to set the expanded domain wider than the conventional resident domain.

The server controller 322 provides the result corresponding to the query according to the request of the moving object 300.

The resident range setting unit 326 sets the resident domain including only the query relating to the moving object 300 under control of the server controller 322.

The resident range setting unit 326 can set the resident domain using the operation capability of the moving object 300 and the query relating to the moving object 300.

That is, the resident range setting unit 326 sets the resident domain corresponding to the operation capability of the moving object 300, whereas the queries in the resident domain relate to the moving object 300.

The memory unit 324 stores a program for the operations of the resident range setting unit 326. In one example, the memory unit 324 stores an index structure including the necessary information for setting the resident domain of the moving object 300, the query relating to the moving object 300, and bit vector information of the node to which the moving object 300 can move.

The communication unit 328, to communicate with the moving object 300, receives the necessary information for setting the resident domain and transmits the information of the resident domain.

The controllers 302 and 322 of the moving object 300 and the server 320 can function as the resident range management unit 304 of the moving object 300 and the resident range setting unit 326 of the server 320, the controllers 302 and 322 are separately illustrated here to distinguish various exemplary functions of the present disclosure, not to limit the scope of the disclosure. One skilled in the art should understand that various modifications can be made without departing from the spirit and scope of the disclosure. For example, the controllers 302 and 322 may process all of the functions of the resident range management unit 304 and the resident range setting unit 326.

Figure 4:
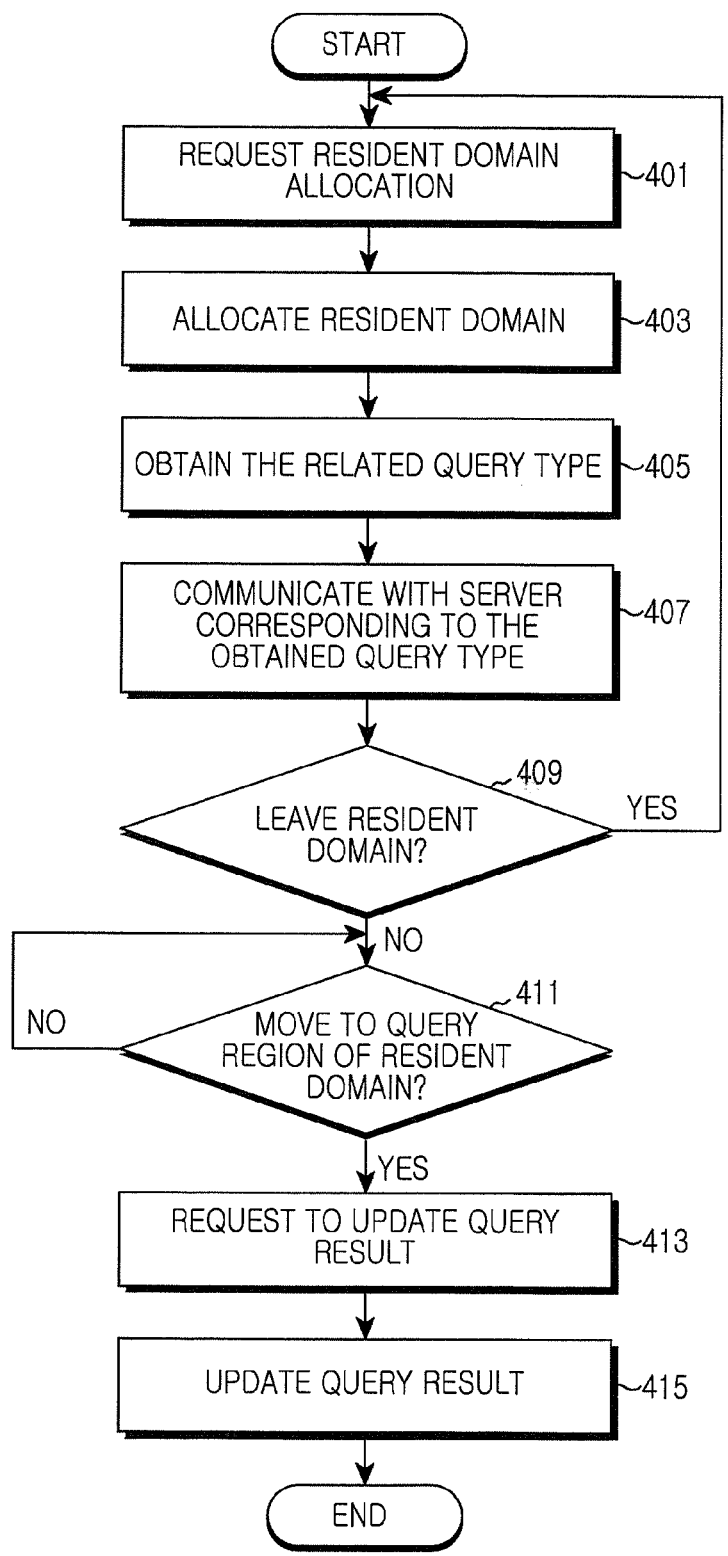
FIG. 4 illustrates a method for processing a query using the expanded resident domain in the moving object according to the present disclosure.

FIG. 4 illustrates a method of the moving object for processing the query using the expanded resident domain according to the present disclosure.

Referring to FIG. 4, the moving object requests the server processing the query to allocate the resident range in step 401 and is allocated the resident range in step 403. In so doing, the moving object can request the resident range by sending to the server, a message including an identifier (object ID (Oid)) of the moving object, a location (p) of the moving object, the object bit vector (O.bv) and the information of the operation capability (n) of the moving object for processing the query. In response to the request, the moving object can receive from the server the resident range set by the server and the list of the queries relating to the resident range.

In step 405, the moving object obtains the query type related to the moving object. Herein, the related query type indicates the classification of only the queries relating to the moving object in the list received from the server.

The moving object communicates with the server corresponding to the query type obtained in step 405, in step 407 and then determines whether the moving object leaves the resident range in step 409. Herein, the moving object communicates only with the server corresponding to the related query among the queries in the resident range.

When leaving the resident range in step 409, the moving object requests the server to allocate a new resident domain in step 401.

By contrast, when not leaving the resident range in step 409, the moving object determines whether the moving object moves into the query region in the resident range in step 411.

Upon moving into the query region in the resident range in step 411, the moving object requests to update the query result in step 413. The moving object can request to update the query result of the corresponding query by sending to the server, a message including information (q) of the moved query, an identifier (object ID (Oid)), and a location (p) of the moving object.

In step 415, the moving object receives a response for the query result update request from the server.

Next, the moving object finishes this process.

Figure 5:
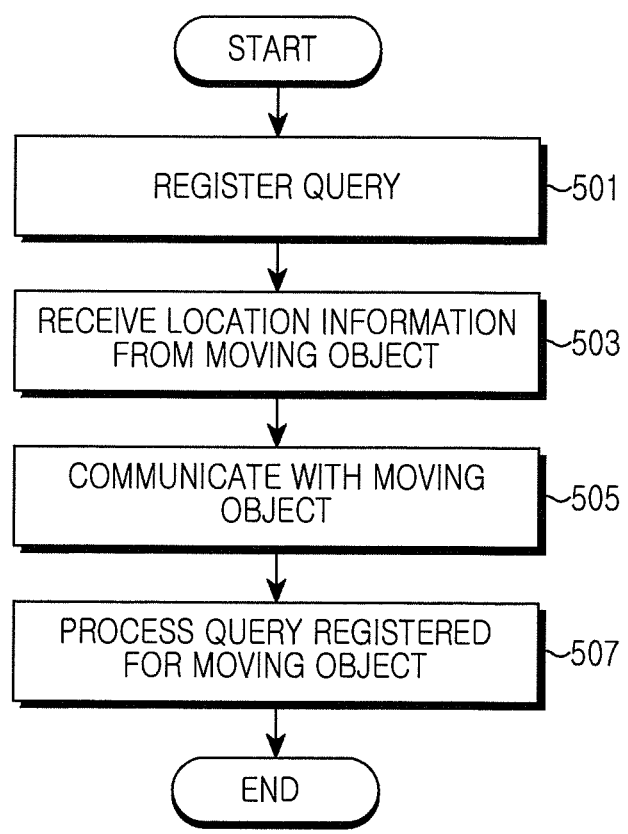
FIG. 5 illustrates a method for processing the query in a server according to the present disclosure.

FIG. 5 illustrates a method of the server for processing the query according to the present disclosure.

Referring to FIG. 5, the server registers the query from the user who wants to use the location-based service in step 501. The query registration is to process the query by detecting the movement of the moving object, and registers a query for providing advertisement to the object entering a particular area, a query for monitoring the object entering a particular area, and the like.

After receiving the location information from the moving object in step 503, the server communicates with the moving object in step 505. Herein, the moving object communicating with the server indicates the object relating to the query corresponding to the server. That is, the server is a server corresponding to the query in the resident range of the moving object, and the moving object communicates only with the server corresponding to the related query of the moving object among the queries in the resident range.

The server processes (e.g., provides the advertisement to the object entering the particular area) the query registered for the moving object in step 507, and then finishes this process.

Figure 6:
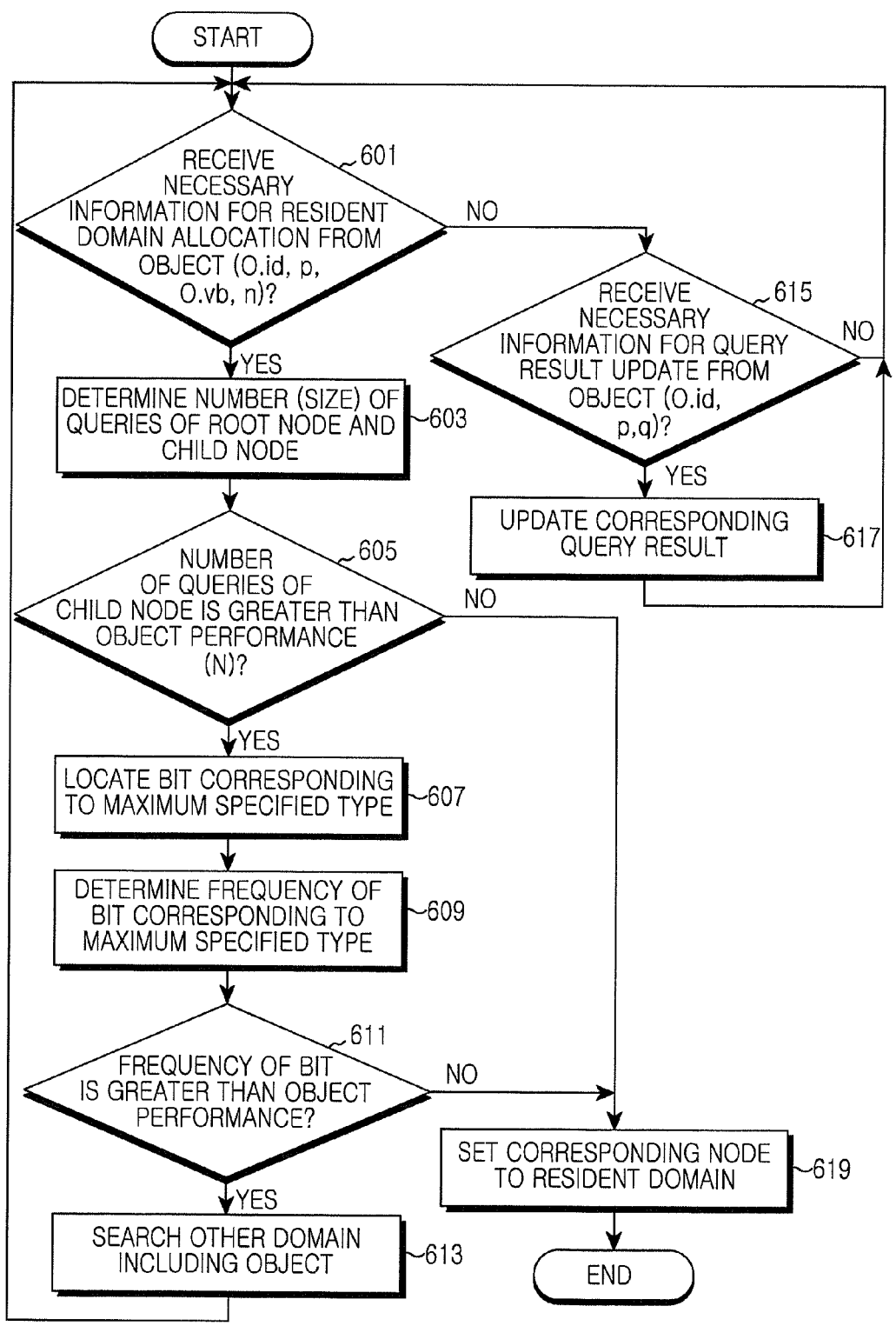
FIG. 6 illustrates a method for processing a message received from the moving object in the server according to the present disclosure.

FIG. 6 illustrates a method of the server for processing a message received from the moving object according to the present disclosure.

Referring to FIG. 6, the server can be requested by the moving object to allocate the resident domain or to update the query result.

In step 601, the server determines whether the necessary information for the resident domain allocation is received from the moving object. Herein, the necessary information for the resident domain allocation is the information of the identifier (object ID (Oid)) of the moving object, the location (p) of the moving object, the object bit vector (O.bv), and the operation capability (n) for processing the query, and can be contained in the resident domain allocation request message.

Upon receiving the necessary information for the resident domain allocation in step 601, the server determines the number of queries of a root node and a child node in step 603 and determines whether the number of the queries in the child node is greater than the operation capability (performance) of the moving object in step 605. This is to determine whether the queries in the entire domain can be processed with the operation capability of the moving object. The root node indicates the whole domain, and the child node can be a partial domain of the root node.

When the number of the child nodes is smaller than the performance of the moving object in step 605, the server determines that the operation capability of the moving objet can process the queries of the whole domain and sets the corresponding domain as the resident domain of the moving object in step 619.

By contrast, when the number of the child nodes is greater than the performance of the moving object in step 605, the server determines that the operation capability of the moving objet cannot process the queries of the whole domain, confirms the location (bi) of the bit corresponding to the query type specified by the moving object at maximum in step 607, and then determines a frequency of the bit corresponding to the type specified at maximum in step 609.

In step 611, the server determines whether the frequency of the bit confirmed in step 607 is greater than the performance of the moving object. The frequency of the bit and the performance of the moving object are compared in order to set the resident domain including the frequently used query by comparing the query of the high frequency with the operation performance of the moving object. That is, the server classifies the queries relating to the moving objet using the bit information confirmed in step 607, and determines whether the classified query can be processed with the operation processing capability.

When the frequency of the bit is less than the performance of the moving object in step 611, the server can determine that the operation performance of the moving object can process the frequently used query. Hence, the server sets the corresponding domain to the resident domain of the moving object in step 619.

When the frequency of the bit is greater than the performance of the moving object in step 611, the server can determine that the operation performance of the moving object cannot process the frequently used query. Hence, the server searches to set other domain including the moving object to the resident domain in step 613.

Not receiving the necessary information for the resident domain allocation in step 601, the server determines whether necessary information for updating the query result is received from the moving object in step 615. Herein, the query result update is to request to process the query of the corresponding domain when the moving object enters the query region of the resident domain.

When not receiving the necessary information for the query result update in step 615, the server repeats step 601.

By contrast, receiving the necessary information for the query result update in step 615, the server processes to update the result of the corresponding query in step 617. Herein, the necessary information for the query result update can be received when the moving object enters the query region in the resident domain or when the moving object leaves the query region. In this example, the server can process the corresponding query in step 617.

Figure 7:
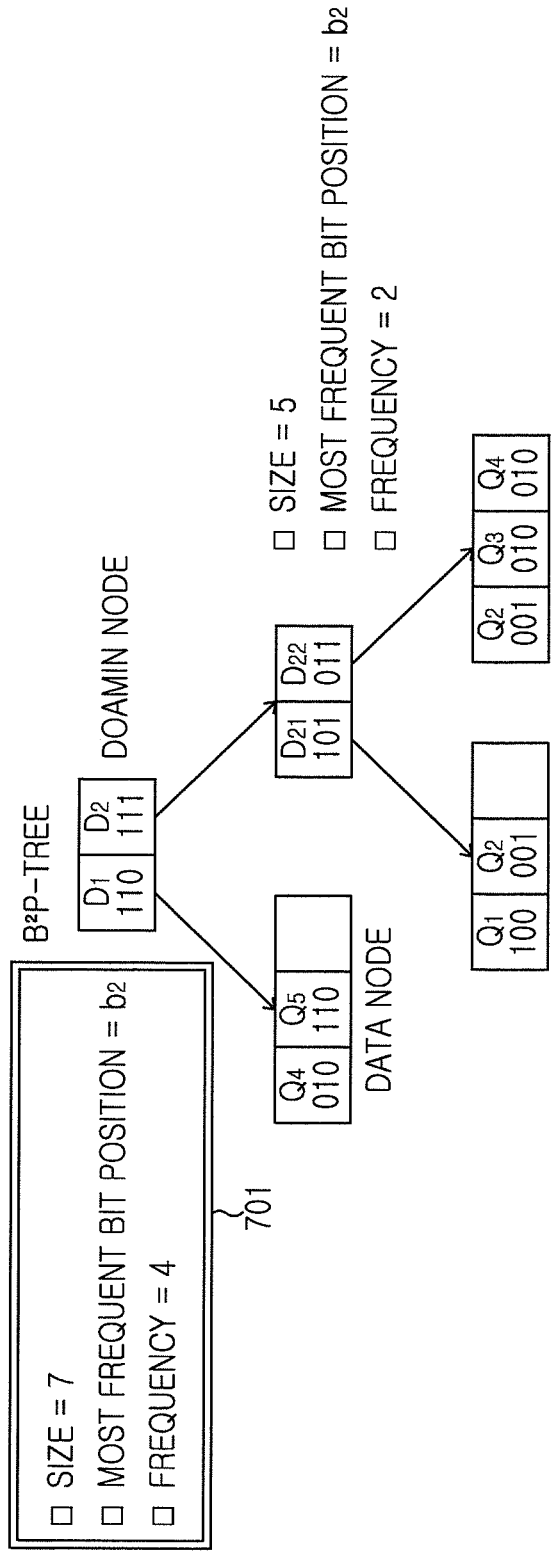
FIG. 7 illustrates a diagram of an index structure used to set the resident domain according to the present disclosure.

FIG. 7 depicts the index structure used to set the resident domain according to the present disclosure.

Referring to FIG. 7, the index structure includes the moving object, the query relating to the moving object, and the bit vector information of the node to which the moving object can move, in addition to a conventional index structure, and is referred to as Bit-vector Binary Partitioning ($B^2P$)-tree.

Based on the $B^2P$-tree, the entire domain D of FIG. 2 can be divided into three nodes D1, D21, and D22.

The divided nodes encode and store the type information of the moving object specified by the queries, as the bit vector.

The type information of the moving object is information about the object corresponding to m-ary query types, and indicates the object bit vector (O.bv) including the m-ary bits b1 through bm as below.

$$b_i = \begin{cases} 1 \\ 0 \end{cases}$$

(1: object relating to the query, 0: object unrelated to the query)

QXX is the bit vector (Q.qv) of the moving object specifying the query, and indicates the query bit vector including m-ary bits as below.

$$q_i = \begin{cases} 1 \\ 0 \end{cases}$$

(1: query specified in the moving object, 0: query unspecified in the moving object)

DXX is a bit vector including entry indicating the node D and indicates an OR operation result of the bit vector of the query of the child node.

For example, given three query types t1, t2 and t3, the bit vector (O.bv) of the moving object corresponding to t1 is "001", and the query type for the continuous range queries Q1 through Q5 can be represented as shown in Table 1.

TABLE 1

| QUERY | SPECIFY TYPE |
|---|---|
| Q1 | t1 |
| Q2 | t3 |
| Q3 | t2 |
| Q4 | t2 |
| Q5 | t1, t2 |

The bit vector (Q.qv) of the queries can be expressed as Q1.$qv$="001", Q2.$qv$="100", Q3.$qv$="010", Q4.$qv$="010", and Q5.$qv$="101", FIG. 2 and FIG. 7 are analyzed now.

The entire domain D of FIG. 2 includes the queries Q4 and Q5 corresponding to D1, and Q1, Q2, Q2, Q3, and Q4 corresponding to D2. Q2 is duplicated in D21 and D22 because the query Q2 is overlapping in D21 and D22.

The divided domains and the queries in the divided domains can be represented in the structure including the bit vector as shown in FIG. 7. The number of the queries in the corresponding domain, the bit position (bi) corresponding to the type specified by the moving object, and the frequency of the bit corresponding to the most frequent type can be represented together 701 as shown in FIG. 7.

Thus, the domain corresponding to D2 includes five queries, and the entire domain (D1∪D2) includes seven queries.

Figure 8:
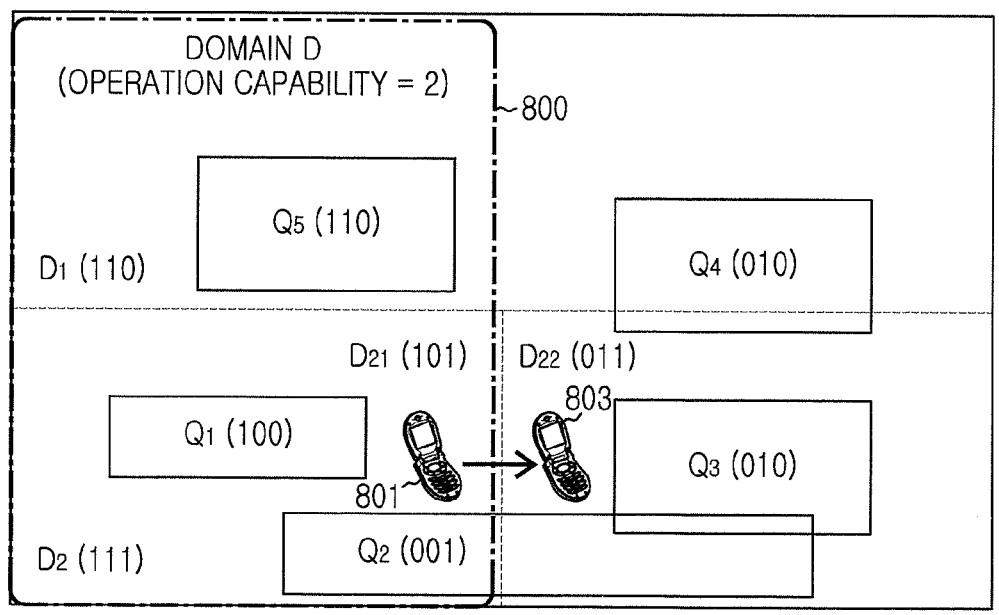
FIG. 8 illustrates an example of the communication of the moving object with the server in the resident domain according to the present disclosure.

FIG. 8 depicts the communication of the moving object with the server in the resident domain according to the present disclosure.

Referring to FIG. 8, it assumed that the moving object is allocated the domain including the queries Q5, Q1 and Q2 as the resident domain 800, and that the moving object involves the queries Q5 and Q1 and does not involve the query Q2. As the operation capability of the moving object is 2, the moving object can involve the queries Q1 and Q5 and thus communicate with the server for the corresponding queries as shown in FIG. 8.

As explained earlier, the query relating to the moving object is obtained using the query type and the resident domain is set to the domain including the queries Q5, Q1, and Q2. When the query involving the moving object is not obtained using the query type as in the conventional method, the resident domain is likely to be limited to the domain including the queries Q1 and Q2 or the domain the queries Q1 and Q5. When the domain including the queries Q1 and Q2 is the resident domain, the moving object unnecessarily communicates with the server for the unrelated Q2. According to various embodiments of the present disclosure, after the resident domain is expanded to the domain including the queries Q1, Q2, and Q5, the moving object communicates with the server only for the queries Q1 and Q5 and does not communicate with the server for the query Q2.

When the moving object 801 leaves the resident domain in step 803, the moving object 801 is allocated a new resident domain based on the corresponding domain.

Figure 9:
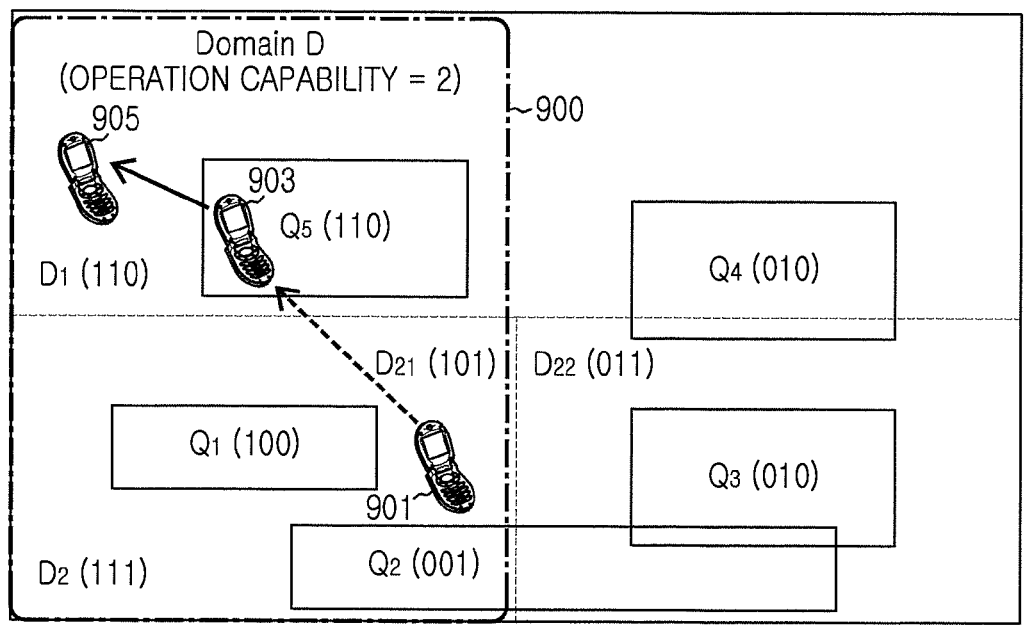
FIG. 9 illustrates another example of the communication of the moving object with the server in the resident domain according to the present disclosure.

FIG. 9 depicts another example of the communication of the moving object with the server in the resident domain according to the present disclosure.

Referring to FIG. 9, it is assumed that the moving object is allocated the domain including the queries Q5, Q1 and Q2 as the resident domain in step 900, and that the moving object involves the queries Q5 and Q1 and does not involve the query Q2. As the operation capability of the moving object is 2, the moving object can involve the queries Q1 and Q5 and thus communicate with the server for the corresponding queries as shown in FIG. 9.

When the moving object moves in the resident domain, the moving object determines whether the moved location corresponds to the query.

Before entering the domain corresponding to the query, the moving object does not communicate with the server relating to the resident domain. This is because the domain without queries is defined as a safe region to prevent the unnecessary communication.

When the moving object is out of the query region in step 901, the moving object does not communicate with the server. When the moving object moves to the query region corresponding to Q5 in step 903, the moving object can process to update the corresponding query result by communicating with the server.

Hence, the moving object can receive the query result corresponding to Q5. When the moving object receiving the query result, leaves the Q5 query region and enters the location in step 905, the moving object does not communicate with the server because this domain is the safe region.

As set forth above, the apparatus and the method for expanding the resident domain of the moving object according to the query type expands to the resident domain including only the query relating to the moving object. Therefore, unnecessary communication between the moving object using the location-based service and the server can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for processing a query of a moving object in a mobile communication system, the apparatus comprising:
   a server configured to expand a resident domain comprising a query to be operated by the moving object when a location-based service is used; and
   the moving object configured to reduce the number of communications with the server according to expansion of the resident domain.

2. The apparatus of claim 1, wherein the server is further configured to set the resident domain to a domain comprising only a query relating to the moving object.

3. The apparatus of claim 2, wherein the moving object reduces the number of the communications with the server by communicating information about the query relating to the moving object within the set resident domain.

4. The apparatus of claim 2, wherein, when the operation capability of the moving object is not able to process the confirmed query, the server is further configured to confirm a domain comprising only queries relating to the moving object among the queries in the domain of the moving object.

5. The apparatus of claim 2, wherein the server is further configured to compare a query in the domain of the moving object with an operation capability of the moving object and set the domain as the resident domain when the operation capability of the moving object is able to process the confirmed query.

6. The apparatus of claim 5, wherein the server is further configured to confirm the query relating to the moving object by determining bit information indicating information of the moving object per query.

7. The apparatus of claim 6, wherein the server is further configured to confirm the query relating to the moving object using an index structure comprising the moving object, a query relating to the moving object, and bit vector information of a node which is a domain the moving object is movable to.

8. The apparatus of claim 1, wherein the moving object reduces the number of the communications with the server by communicating information about the query relating to the moving object within the resident domain.

9. The apparatus of claim 1, wherein, responsive to detecting a location of the moving object in the resident domain, the moving object is further configured to communicate with the server when the moving object is in a domain corresponding to the query, and omit communication with the server when the moving object is not in the domain corresponding to the query.

10. The apparatus of claim 1, wherein, when confirming that the location of the moving object leaves the set resident domain, the moving object is further configured to communicate with the server.

11. A method for processing a query of a moving object in a mobile communication system, the method comprising:
    expanding a resident domain comprising a query to be operated by the moving object when a location-based service is used; and reducing the number of communications between the moving object and a server according to the expansion of the resident domain.

12. The method of claim 11, wherein expanding of the resident domain comprises:
setting the resident domain to a domain comprising only a query relating to the moving object.

13. The method of claim 12, wherein the reducing of the number of the communications between the moving object and the server comprises:
communicating about the query relating to the moving object within the set resident domain.

14. The method of claim 12, wherein setting the resident domain to the domain comprising only the query relating to the moving object comprises:
when the operation capability of the moving object is not able to process the confirmed query, confirming a query relating to the moving object; and
confirming a domain comprising only a query relating to the moving object among the queries in the domain of the moving object.

15. The method of claim 12, wherein setting the resident domain to the domain comprising only the query relating to the moving object comprises:
confirming a query in the domain of the moving object;
comparing the confirmed query with an operation capability of the moving object; and
when the operation capability of the moving object is able to process the confirmed query, setting the domain to the resident domain.

16. The method of claim 15, wherein confirming the query relating to the moving object comprises:
determining bit information indicating information of the related moving object per query.

17. The method of claim 16, wherein confirming the query relating to the moving object further comprises:
using an index structure comprising the moving object, a query relating to the moving object, and bit vector information of a node which is a domain the moving object is movable to.

18. The method of claim 11, wherein reducing the number of the communications between the moving object and the server comprises:
communicating information about the query relating to the moving object within the resident domain.

19. The method of claim 11, wherein reducing the number of the communications between the moving object and the server comprises:
detecting a location of the moving object in the resident domain;
communicating with the server when the moving object is in a domain corresponding to the query; and
omitting communication with the server when the moving object is not in the domain corresponding to the query.

20. The method of claim 11, wherein reducing the number of the communications between the moving object and the server comprises:
detecting a location of the moving object in the resident domain; and
when confirming the egress of the set resident domain, communicating with the server.

* * * * *